Sept. 12, 1933. V. E. EDWARDS Re. 18,950
HANDLING AND CONVEYING HOT METAL STOCK
Original Filed Sept. 21, 1925
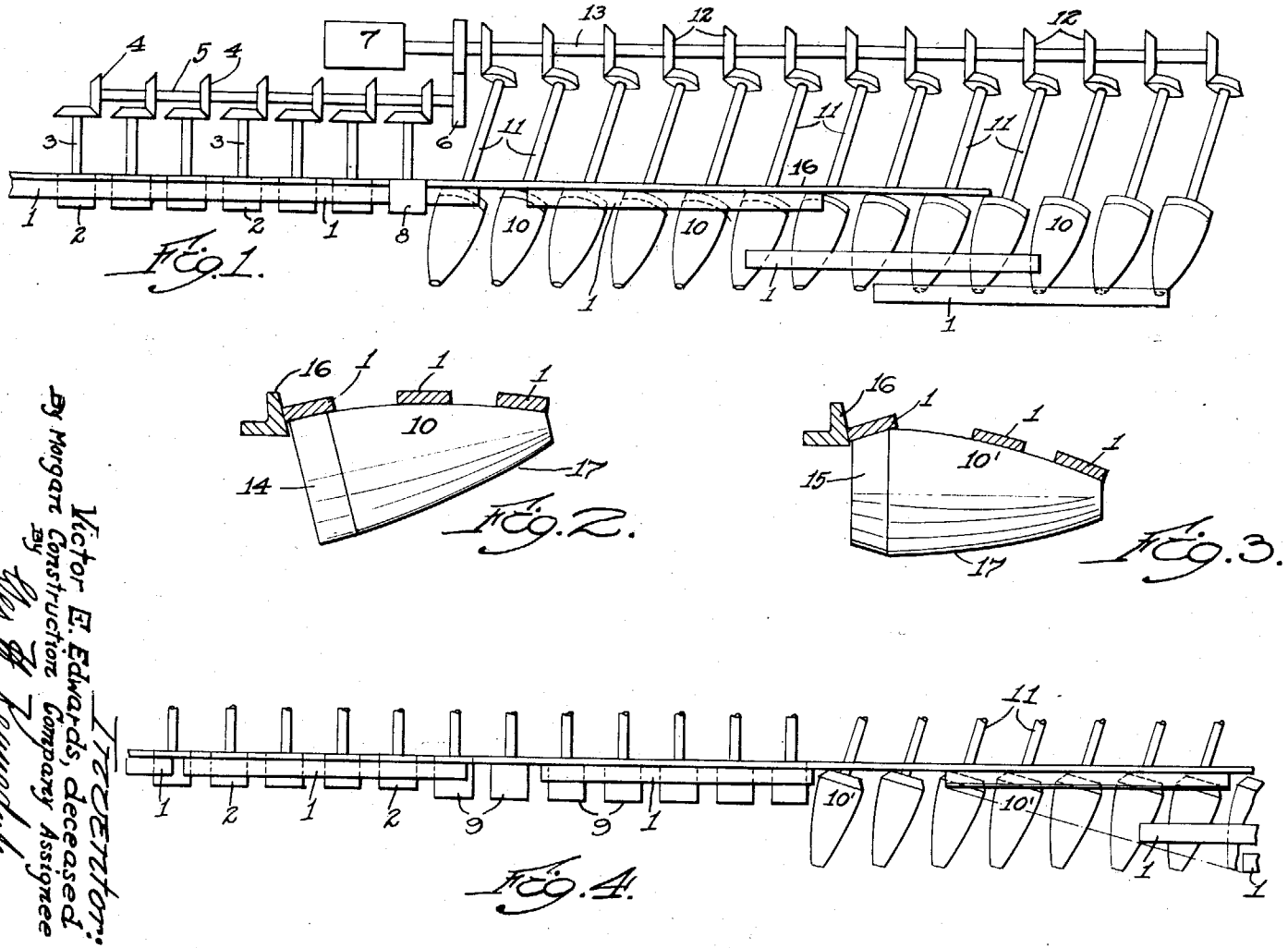
Inventor:
Victor E. Edwards, deceased
By Morgan Construction Company Assignee
By Geo. H. Kennedy Jr.
Attorney Reissued Sept. 12, 1933

Re. 18,950

UNITED STATES PATENT OFFICE 18,950

HANDLING AND CONVEYING HOT METAL STOCK

Victor E. Edwards, deceased, late of West Boylston, Mass., by Morgan Construction Company, assignee, Worcester, Mass., a corporation of Massachusetts Original No. 1,587,069, dated June 1, 1926, Serial No. 57,689, September 21, 1925. Application for reissue June 13, 1932. Serial No. 617,017

12 Claims. (Cl. 198—127)

The present invention relates to improvements in the handling of metal or like elongated stock on skewed conveyor rollers, by way of insuring at all times, in said stock's broadside movements on and delivery from said rollers, the maintenance of parallelism with its line of delivery to said rollers. In one of its adaptations, as herein specifically described, the invention contemplates the substantial removal, unobstrusively, of velocity and energy from rapidly moving hot bars or billets which, for example, have been cut by a flying shear into commercial lengths from the elongated rapidly moving stock as it emerges from the final rolls of a rolling mill. Such bars or billets, being highly heated, are extremely susceptible to bending and deformation, and it is an object of the present invention to provide for their automatic deceleration from the high speeds at which they are travelling without bending, and also to overlap successive bars in the decelerating process, thereby making it possible and safe to deposit them in a piling bin, or to transfer them, directly or indirectly, to a cooling bed, or to handle them by any method of handling which is applicable to slow speed billets and bars.

The above and other objects are attained in the manner and by the means hereinafter set forth in detail, reference being had to the accompanying drawing, in which—

Fig. 1 is a plan view of apparatus illustrating the invention, the same including a skew roller table whose rolls are conical, for the deceleration of the stock.

Fig. 2 is an enlarged fragmentary view, showing one form of conical skew conveyor roll adapted to be used for such deceleration.

Fig. 3 is a view similar to Fig. 2, showing another form of conical skew conveyor roll adapted to be used for such deceleration.

Fig. 4 is a view similar to Fig. 1, showing a modified form of approach to the skew roller table.

Like reference characters refer to like parts in the different figures.

Referring to Fig. 1, the successive pieces of stock 1, 1 are shown as travelling at high speed, in close order on conveyor rolls 2, 2, of ordinary construction. Said conveyor rolls 2, 2 are here shown as mounted on shafts 3, 3, the latter being driven in any suitable manner as by gearing 4, 4 from a countershaft 5, which in turn is driven by gearing 6 from a motor 7. The conveyor rolls 2, 2, in conjunction with a pair of suitably driven pinch rolls 8, constitute, in Fig. 1, the approach to the skew roller table; in this form of the invention, as hereinafter more particularly described, provision is made for adequate end clearance between successive bars arriving on said skew roller table, by rotating the latter's rolls to give a definitely higher surface speed than the conveyor rolls 2, 2 and the pinch rolls 8.

In the other form of the invention, shown in Fig. 4, the successive pieces 1, 1, run out in close order on the conveyor rolls 2, 2, are given adequate end clearance before they reach the skew roller table by passage over a plurality of conveyor rolls 9, 9, which run at a surface speed definitely higher than the rolls 2, 2; this allows the rolls of the skew roller table to be run at a much slower speed than the corresponding rolls in Fig. 1.

The skew roller table is shown in Fig. 1 as constituted by a plurality of substantially conical rolls 10, 10, whose shafts 11, 11 are driven in any suitable manner as by gearing 12, 12 from a shaft 13 of motor 7. The axes of the several rolls 10, 10 are skewed, with reference to the longitudinal line of travel of the billets or bars 1, 1 as delivered to said rolls, said axes making acute angles with the line of movement of the approaching bars or billets. Each roll 10 may be of the construction shown in Figs. 1 and 2, with its axis inclined upwardly, or it may be of the construction shown at 10′ in Fig. 3, with its axis horizontal. In the first case, the receiving end of the roll, in alinement with the rolls 2, 2 and 8, or 9, 9, that constitute the approach to the skew roller table, will be substantially cylindrical, as shown at 14, Fig. 2; in the second case, said receiving end of the roll 10′ will be frusto-conical in form, as shown at 15, Fig. 3. In both cases, the billet supporting surfaces afforded by the receiving portions 14, 14 or 15, 15 of the rolls 10, 10 or 10′, 10′ is inclined from the horizontal by an angle somewhat less than the angle of repose of the billets received thereon; as shown in Figs. 2 and 3, said billets as received and run out on said receiving portions 14, 14 or 15, 15 are, as hereinafter explained, initially maintained by gravity in sidewise contact with a side guard 16 of suitable construction. Beyond the receiving portions 14, 14 or 15, 15, the rolls 10, 10 or 10′, 10′ provide elongated frusto-conical decelerating portions 17, 17, the latter preferably being surfaces of revolution generated by a curved line of large radius.

The operation of the apparatus constituting the invention in the form shown by Fig. 1 is as follows:—The hot flexible billets 1, 1 are run out by the pinch rolls 8 onto the receiving portions 14, 14 or 15, 15 of the rolls 10, 10, or 10′, 10′, but notwithstanding the fact that these receiving portions have a higher surface speed than the billet, the latter is not permitted to start accelerating to this higher speed until its rear end is released by the pinch rolls 8, 8, the latter dominating the travel of the piece. The instant such release occurs, the billet begins to accelerate in speed, thus gradually increasing the distance between its rear end and the front end of the following billet, so as to produce a sufficient end clearance between successive billets. During this acceleration, and until the billet attains substantially the surface speed of the receiving portions 14, 14 or 15, 15, said billet's motion is not appreciably influenced by the skewed disposition of the rolls 10, 10 or 10′, 10′, because of the fact that while acceleration is occurring the friction between the billet and the supporting surfaces of said rolls is a skidding friction, and such skidding friction, notwithstanding the axially skewed disposition of rolls 10, 10 or 10′, 10′ is insufficient to inaugurate the broadside uphill movement of the billet away from the side guard 16 that would occur with static rather than slipping friction between stock and rolls. In consequence, the billet for an appreciable time after its delivery to the rolls 10, 10 or 10′, 10′ is maintained by gravity in contact with the side guard 16 by the downward inclination toward said guard of the roll surfaces 14, 14 or 15, 15; as soon, however, as the billet through said acceleration reaches substantially the surface speed of the receiving portions 14, 14 or 15, 15, the frictional relation changes from sliding to static, involving a very material increase in the coefficient of friction, so that the billet, in response to the axially skewed disposition of the rolls 10, 10 or 10′, 10′ at once shifts sidewise across the skew roller table, being carried up the incline of the receiving surfaces and, as here shown, onto the decelerating portions 17, 17. On the portions 17, 17 the broadside movement, combined with the longitudinal movement, continues, and owing to this broadside movement, each billet is gradually decelerated, since the surface speed of the rolls 10, 10 or 10′, 10′ grows less and less as the billet moves broadside toward the smaller ends of the conical surfaces. Such deceleration automatically establishes the overlapping of the billets as illustrated in Fig. 1, and permits, ultimately, their delivery from the rolls 10, 10 at the same point, in the absence of appreciable velocity and without having undergone any bending or deformation in the process of reducing their original velocity.

In the operation of the alternative apparatus shown in Fig. 4, the action of the skew roller table, constituted by the skewed conical rolls 10, 10, or 10′, 10′, is exactly the same as above described, insofar as reduction in velocity and overlapping of billets are concerned. However, in the apparatus shown in Fig. 4, the necessary increase of end clearance between successive billets is effected by the high speed conveyor rolls 9, 9 so that the rolls 10, 10, or 10′, 10′ of the skew roller table can be run at a relatively lower speed than the conveyor rolls 9, 9, instead of at the relatively higher speed required by the arrangement shown in Fig. 1. Consequently, the initial action of the receiving portions 14, 14 or 15, 15 of said rolls 10, 10, or 10′, 10′, is to decelerate each billet, and during this deceleration, which involves skidding friction between the rolls and the billet, the latter maintains by gravity its edgewise contact with the side guard 16. The conveyor rolls 9, 9 run enough faster than the skewed rolls to insure the maintenance of this slipping or skidding relation until the full length of the billet arrives on said skewed rolls; otherwise, of course, the leading end of the billet might be shifted sidewise ahead of the trailing end, by the billet becoming decelerated prematurely to the surface speed of said rolls. When the billet speed has decreased to the surface speed of the rolls, the increase of friction that takes place as above described, in changing from skidding firction to static friction, allows the billet to respond to the axially skewed disposition of the rolls 10, 10, or 10′, 10′, by a sidewise movement up the incline of the receiving portions 14, 14 or 15, 15, thus inaugurating the side stepping decelerating and overlapping action that occurs as previously described, on the conical roll portions 17, 17.

In both forms of the invention, the pieces of stock 1, 1, notwithstanding their flexibility and susceptibility to bending and deformation, are maintained at all times in a straight line condition. In this connection, it will be evident that the ordinary endwise delivery of elongated material to skewed conveyor rollers invariably creates a tendency for the first end of the piece to shift sidewise ahead of its last end, thus bending the piece and deflecting it from parallelism with its previous direction of movement. According to the present invention, this difficulty is obviated, because the speed differential between the approach conveyor rolls 2, 2 or 9, 9 and the skewed rolls 10, 10, or 10′, 10′, in conjunction with the gravitational effect obtained by said last-named rolls, effectually delays the side stepping action until the entire length of the piece is supported on said skewed rolls. Thereupon, when the stock speed corresponds substantially to the surface speed of the downwardly sloping portions 14, 14 or 15, 15 of the skewed rolls, the apparatus functions automatically in the absence of any forcible engagement with the stock or any shifting of said rolls, to procure the sidewise delivery of each piece from said rolls, in a direction away from the side guard 16.

What is claimed is:—

1. In apparatus of the class described, a plurality of alined conveyor rolls having their axes skewed with reference to the line of stock-delivery thereto, a side guard operatively associated with the stock-supporting surfaces of said rolls, said surfaces being inclined downwardly toward said side guard and away from those ends of the rolls toward which the stock, because of said skewing, tends to move sidewise, and means for rotating said rolls to give said surfaces a surface speed sufficiently different from the stock-delivery speed, to prevent sidewise movement of a piece of stock on said rolls away from said guard until its entire length is supported on said surfaces.

2. The combination with a plurality of conical skewed conveyor rolls adapted for the deceleration and sidestepping of successive hot bars delivered endwise thereto, of means for delivering said bars to said rolls at a speed different from the surface speed of the receiving portions of said rolls, whereby, in consequence of the skidding friction between each bar and said receiving portions, the sidestepping movement is delayed until said bar reaches a speed substantially the same as the surface speed of said receiving portions.

3. In apparatus of the class described, a plurality of alined conveyor rolls having their axes skewed with reference to the line of stock-delivery thereto, a side guard operatively associated with the stock-supporting surfaces of said rolls, said surfaces being inclined downwardly toward said side guard and away from those ends of the rolls toward which the stock, because of said skewing, tends to move sidewise, and means for delivering the stock to said rolls at a speed different from the surface speed of said stock-supporting surfaces, whereby, in consequence of skidding friction between said surfaces and the piece of stock, the latter's sidewise movement away from said guard is delayed until said piece reaches a speed substantially the same as the surface speed of said surfaces.

4. In apparatus of the class described, a plurality of alined conveyor rolls having their axes skewed with reference to the line of stock-delivery thereto, a guard alongside said rolls, at the other ends of the same from those toward which the stock moves sidewise, due to said skewing, and means for delivering the stock to said rolls at a speed lower than the surface speed of their stock-supporting surfaces, the latter being inclined downwardly toward said guard, whereby gravity is effective during each piece's acceleration on said rolls, to prevent said sidewise movement.

5. The combination with a plurality of skewed conveyor rolls adapted for the sidestepping of successive bars delivered endwise thereto, of means for delivering said bars to said rolls at a speed sufficiently greater than the surface speed of the receiving portion of said rolls to skid substantially the entire length of each bar on to said rolls.

6. In apparatus of the class described, a plurality of alined conveyor rolls having their axes skewed with reference to the line of stock-delivery thereto, said axes being also inclined upwardly from the horizontal in the direction of those ends of the rolls toward which the stock, due to said skewing, tends to move sidewise, a guard extending alongside the other ends of said rolls to prevent the stock from runnig off sidewise by gravity, and means for delivering the stock to said rolls at a speed enough greater than the surface speed of said rolls to cause skidding initially between said rolls and each pieces of stock, thereby making gravity effective to maintain each piece in sidewise contact with said guard until the full length of said piece is supported on said rolls.

7. The combination with conveying means for the endwise delivery of successive pieces of stock, of a series of rollers skewed to the line of stock delivery thereto from said conveying means and having surface speeds higher than the stock delivery speed, and stock-engaging means alongside said skewed rollers and toward which their surfaces incline downwardly, whereby to restrain each piece by gravity, while it is in skidding contact with said rollers, from responding to the skewed disposition of said rollers.

8. The combination with conveying means for the endwise delivery of successive pieces of stock, of a series of rollers skewed to the line of stock delivery thereto from said conveying means and having surface speeds enough higher than the stock delivery speed to produce skidding between said rollers and each piece of stock until its full length is supported on said rollers, and a side guard toward which the roller surfaces slope downwardly, whereby to restrain each piece by gravity, while it is in skidding contact with said rollers, from responding to the skewed disposition of said rollers.

9. The combination with conveying means for the endwise delivery of successive pieces of stock, of a series of rollers skewed to the line of stock delivery thereto from said conveying means and having surface speeds lower than the stock delivery speed, and stock-engaging means alongside said skewed rollers and toward which their surfaces incline downwardly, whereby to restrain each piece by gravity, while it is in skidding contact with said rollers, from responding to the skewed disposition of said rollers.

10. The combination with conveying means for the endwise delivery of successive pieces of stock, of a series of rollers skewed to the line of stock delivery thereto from said conveying means and having surface speeds enough lower than the stock delivery speed to produce skidding between said rollers and each piece of stock until its full length is supported on said rollers, and a side guard toward which the roller surfaces slope downwardly, whereby to restrain each piece by gravity, while it is in skidding contact with said rollers, from responding to the skewed disposition of said rollers.

11. The combination with a plurality of skewed conveyor rolls adapted for the sidestepping of successive bars delivered endwise thereto, of means for delivering said bars to said rolls at a speed sufficiently less than the surface speed of the receiving portion of said rolls to skid substantially the entire length of each bar on to said rolls.

12. The combination with conveying means for the endwise delivery of successive pieces of stock, of a plurality of alined conveyor rollers having their axes skewed with reference to the line of stock delivery thereto from said conveying means, a side guard flanking said rollers at the ends thereof away from which the stock, on account of said skewed roller axes, tends to move sidewise, and toward which side guard the roller surfaces slope downwardly, and means for driving said skewed rollers at surface speeds different from the stock delivery speed imparted by said conveying means, whereby to delay, by skidding action between said skewed rollers and the stock, the sidewise motion of the stock away from said side guard until the entire length of the piece is supported by said skewed rollers.

MORGAN CONSTRUCTION COMPANY,
*Assignee of Victor E. Edwards, Deceased.*
[L. S.] By JOHN W. SHEPERDSON,
*Vice President.*